Aug. 27, 1968   J. D. FOSTER   3,398,653
PISTON
Filed Aug. 24, 1966
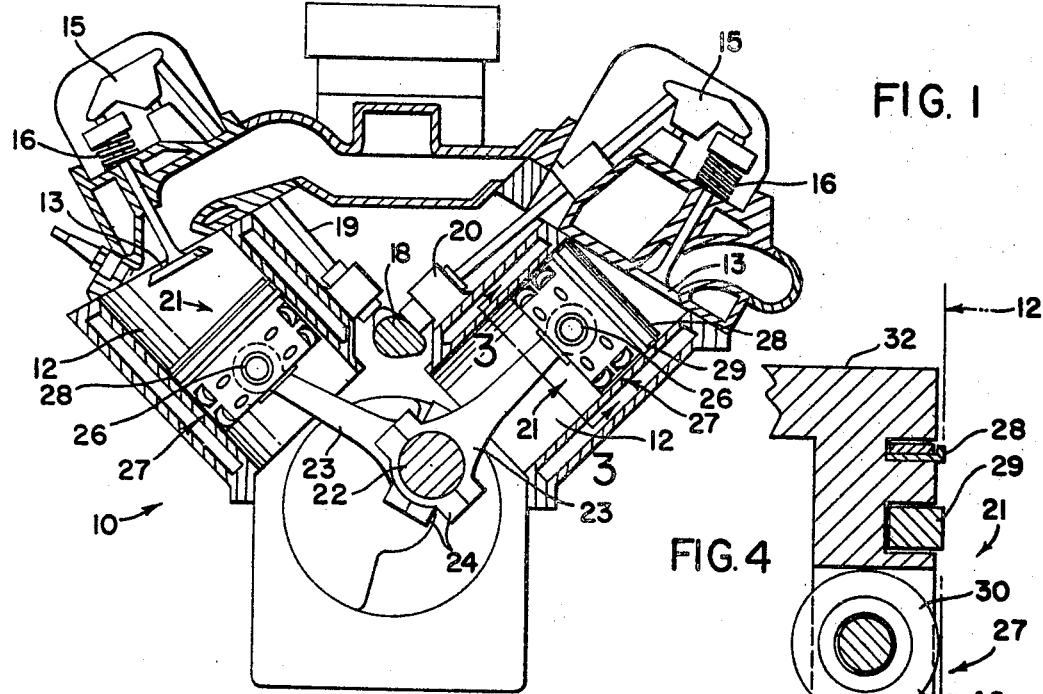
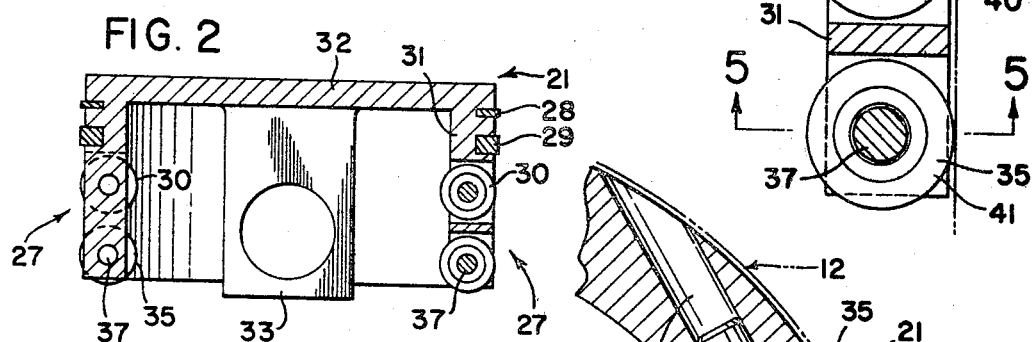
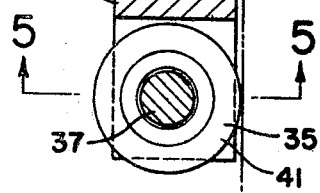
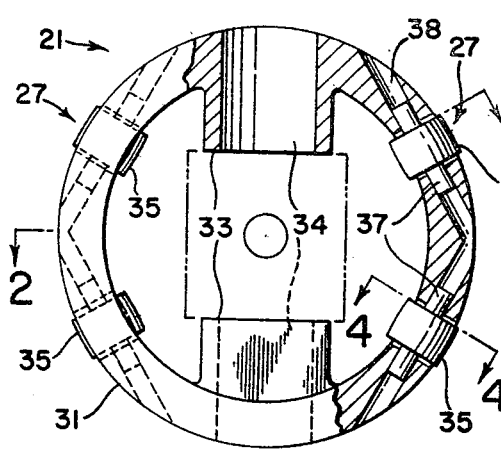
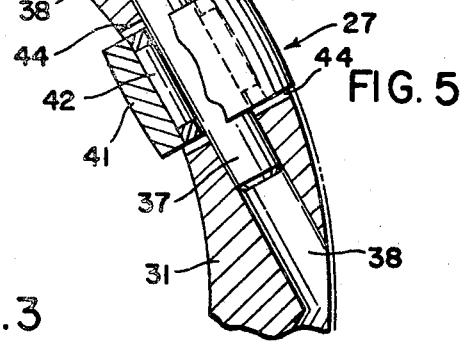
INVENTOR.
JOHN DAVID FOSTER
BY
*Fay, Sharpe & Mulholland*
ATTORNEYS

United States Patent Office 3,398,653
Patented Aug. 27, 1968

3,398,653
PISTON
John D. Foster, 3910 W. Erie Ave.,
Lorain, Ohio 44053
Filed Aug. 24, 1966, Ser. No. 574,775
3 Claims. (Cl. 92—178)

ABSTRACT OF THE DISCLOSURE

This application relates to a piston having two sets of four roller bearings mounted and supported in a skirt, one set being above and the other set below the wrist pin so that only the bearings, and not the piston come into contact with the cylinder wall. Each roller bearing is normally mounted on a pin which forms an angle of 30° with the wrist pin.

---

This invention relates to an anti-friction reciprocating piston. More particularly, this invention relates to a piston in which roller bearings are mounted so that friction may be reduced between the piston and a cylinder.

Specifically, the present invention comprises a piston having a generally cylindrically shaped outer skirt. The top of the cylindrically shaped wall is closed and means are provided in the cylindrically shaped skirt below the top portion for mounting a wrist pin. Small roller bearings are mounted on pins in and wholly supported by the skirt. The outer surfaces or housing of the roller bearings form arcs of circles which are above and below the wrist pin and are concentric with the circumference of the cylindrically shaped skirt.

In the usual internal combustion engine, compressor, etc. a piston moves in intimate contact with a cylinder. The friction resulting from such a relationship requires oil systems which lubricate the piston and cylinder to reduce this friction. However, in spite of lubrication, the piston movement is greatly hindered and highly inefficient; and it is to obvious advantage to reduce friction as much as possible.

Many solutions have been proposed to reduce the friction between the piston and cylinder. Various crude types of anti-friction devices have been mounted on either the piston or the cylinder wall, but these devices have never been successful in withstanding the tremendous forces applied to them by modern high r.p.m. engines.

In one prior art attempt, two circles of loosely embedded metal balls were arranged about a piston head in seats which allowed them to roll as the piston reciprocated. However, the metal balls were easily gummed up and were virtually impossible to adequately lubricate because they had approximately two-thirds of their surfaces within the seats.

Another prior art design attempted to eliminate friction caused by slapping but did not eliminate direct piston-cylinder wall contact. Slapping is that condition where the piston, because of tolerances in the cylinder, hits one side of the cylinder and then the other as it reciprocates. Two large anti-friction rollers were extended through opposite portions of the piston wall to engage the cylinder's inside walls. The rollers were supported by adjustable brackets which were connected to the wrist pin in a manner not practical in modern high speed racing engines which operate at rates as high as 10,000 r.p.m.

Other anti-friction attempts provided large adjustable rollers in various arrangements which created clapping and abnormal cylinder damage due to lubrication difficulties. Accordingly these arrangements are unsuitable for today's close tolerance high speed, high temperature engines.

In the preferred embodiment of the present invention the roller bearings extend through the skirt of the piston. This facilitates lubrication since oil may splash on the roller bearing from the inside of the piston.

Furthermore, the simple construction of the present piston lends itself to a relatively inexpensive manufacturing process. The piston is initially formed by the same methods as the common pistons used today. The method of manufacturing most pistons is by casting. The only additional step that is required in the present invention is the drilling of openings in the skirt. However, if the piston is made of an alloy which does not lend itself to casting, then other methods of manufacture would be necessary.

In addition to providing a system which will substantially reduce the friction between the piston and the cylinder, the present invention does not have the disadvantages of slapping or frictional engagement of the piston and cylinder.

A piston constructed according to the principles of the present invention include small roller bearings mounted on pins thereby to avoid engagement of its circumferences with the stationary surface of the cylinder during reciprocation. Accordingly, the only friction present is that from the contact between the roller bearings and the rings with the cylinder wall and the slight friction within the bearings themselves.

The use of small roller bearings to contact the cylinder also reduces error which is induced by dimensional variations caused by temperature changes. The smaller bearings expand and contract less than the unwieldly anti-friction devices of the prior art and this provided better tolerances within the engine over a wide range of temperatures, without increases in friction. Any overheating problem will also be minimized since the skirt of the piston is not in contact with the cylinder. The only way that heat may be transferred by conduction, i.e. direct contact, to the piston is through the roller bearing and the supporting pin.

The cooler running engine, which results from the use of roller bearings, permits smaller clearances between the piston and cylinder. Slapping is greatly reduced because of the resulting tight fit of the piston in the cylinder. The present invention contemplates clearances of 5 or 6 thousandths in a cold engine and 1 or 2 thousandths in a warm engine. This is a significant reduction of the conventional 8 or 10 thousandths for a cold engine and 3 or 4 thousandths for a warm engine.

Moreover, the small size of the bearings permits their mass to be distributed evenly around the piston to provide a distribution of weight which is nearly the same as any ordinary piston.

Slapping is reduced by the novel piston of the invention partially because of the positioning of the roller bearings in two rows around the piston wall, one row being above the wrist pin connection and the other below it. In this way the present invention also reduces the need for extremely precise angles in the relation between the wrist pin connector and the rollers since the strategically spaced rollers may absorb a force from any direction. Consequently the plurality of carefully placed roller bearings on the piston provided inherent stability. Because of this, the necessity for having the piston touch the cylinder wall to stabilize itself and prevent slapping is eliminated.

FIG. 1 shows a common internal combustion engine using the improved piston.

FIG. 2 shows a cross section of the improved piston and is taken along section 2—2 of FIG. 3.

FIG. 3 shows a bottom view of the partially cut away piston and is taken along section 3—3 of FIG. 1.

FIG. 4 is taken along section 4—4 of FIG. 3 and shows an enlarged cross section of one portion of the improved piston.

FIG. 5 shows a section taken along 5—5 of FIG. 4.

In the illustrated embodiment, the internal combustion engine 10 has cylinders 12 and valves 13 for the cylinders 12. Rocker arms 15 and springs 16 control the movement of the valves 13. The rocker arms 15 are actuated by a cam shaft 18 which transmits its motion to the rocker arms 15 through rods 19 which reciprocate in brackets 20 in conventional manner.

Pistons 21 are positioned within the cylinders 12 and are connected to a crank shaft 22 by means of connecting rods 23. The connecting rods 23 are secured to the crank shaft 22 by means of caps 24 having semi-circular inner portions adapted to fit around the crank shaft 22.

The other ends of the connecting rods 23 are pivotally connected to the pistons 21 by means of wrist pins 26 which are journalled in the pistons for rotational movement.

The piston 21 reciprocates within the cylinder 12 during the operation of the engine 10. Roller bearings 27 are provided in the sides of the piston and engage the inside of the cylinder 12.

A compression ring 28 and an oil ring 29 are provided at the top portion of the piston. It should also be noted that the compression and oil rings 28 and 29 respectively and the roller bearings 27 are the only elements that engage the cylinder wall.

FIG. 2 shows an enlarged view of the cross-section of the piston 21. This view is taken along sections 2—2 of FIG. 3. The piston 21 has a generally cylindrically shaped skirt 31 and a top portion 32 which may be a flat or contoured surface and closes one end of the cylindrical shaped skirt 31. An integrally cast boss or bracket 33 for the wrist pin is provided with an opening 34 through which the wrist pin 26 may be inserted.

The roller bearings 27 may be divided into two sets, an upper set 30 and a lower set 35. Each of these sets has four roller bearings in a plane parallel to the top 32 of the cylinder 21. The roller bearings 27 are suspended in the skirt so that their outermost portion extends slightly beyond the outside diameter of the cylindrically shaped wall 31. However, they do not extend as far as the outside diameter of the compression ring 28 and the oil ring 29. By way of example, it has been found that the diameter of the circle, made by the roller bearings, may be 4.057"±.001" when the outside diameter of the piston is 4.0475"±.0005" and the inside diameter of the cylinder is 4.063"±.0005".

FIG. 3 is a bottom view taken along section 3-3 of FIG. 1. Part of FIG. 3 has been cut away in order to clearly show the suspension of the roller bearings 27 in the piston skirt 31. The roller bearings 35 are secured in the piston skirt 31 by means of pins 37 which pass through and are force fit in openings 38 in the piston skirt 31. The openings 38 form chords in the circular cross-section of the piston.

The pins 37 pass through central openings 35 in the roller bearings 27 and loosely secure them in position. The roller bearings 27 are allowed to slide on the pins 37 so that the piston may center itself in the cylinder. The roller bearings 27 pass through the entire thickness of the piston wall 31. The pin 37 is maintained in position in the piston wall 31. During the formation of the piston 21 a small projection (not shown) might be staked in the opening 38 to insure the correct position of the pin 37.

It is clear from FIG. 3 that the outermost portions or outer rings of the roller bearings 27 form arcs on a circle having the same center as the piston.

The axis of the pin 37 holding the roller bearings 27 form an angle of approximately 30° with the central axis of the wrist pin channel 34. While other angles may be used, it has been found that slapping is greatly reduced by the use of the roller bearings 27 at this angle and the use of two sets of roller bearings having four roller bearings in each plane. Three or five or more roller bearings may be used in each plane, and slapping may still be reduced. A significant factor in this respect is that there are two layers or planes of roller bearings, one above the wrist pin and one below it as seen by FIG. 2. A further reason for using roller bearings is that the reduced friction results in a cooler engine in which tighter tolerances may be maintained.

The illustrated configuration results in the reduction of slap partially because of the force distribution. As the connecting rod applies a force to the piston through the wrist pin, the forces set up will be absorbed by the roller bearings in the top plane on one side of the wrist pin and the bottom plane on the other side of the wrist pin. That is, as seen in FIG. 2, as the connecting rod pushes to the left at an angle toward the top of the piston, there will be a transmission of the force to the upper roller bearings 27 on the left side of FIG. 2 and to the lower roller bearings 27 on the right side of FIG. 2.

By having at least three roller bearings in a given plane above and below the wrist pin, the piston is centered and any errors in the angular alignment of the wrist pin channel 34 and the connecting rod 23 would not result in any slapping. That is, if there were only one or two roller bearings on each side of the piston, any misalignment between the angle of the wrist pin and the roller bearings would result in a tendency of the piston to slap because of the lack of engagement of the piston walls with the cylinder walls. Moreover, if less than three bearings were used in each plane, the piston could move sideways and make contact with the cylinder wall.

FIG. 4 is taken along section 4—4 of FIG 3. It shows an enlarged view of the roller bearings 27 as they are mounted in the piston skirt 31. It shows the relationship between the roller bearings 35 and the compression ring 28 and the oil ring 29. Generally, the steel tires 40 and 41 on the roller bearings 27 extend to an outer diameter slightly less than that of the compression ring 28, but greater than the outer diameter of the piston skirt 31.

FIG. 5 shows a sectional 5—5 of FIG. 4, which is partially cut away to expose the roller bearing. The roller bearing generally is pressed into a housing, which is the outer tire 41 to make it have an arc shape. The roller bearing has inner rollers 42 which roll around the pin 37. Spaces 44 are maintained so that the roller bearing 27 is not in frictional engagement with the sides of the channel cut in the piston wall 31. The construction of the improved piston, as described above has substantial benefits. It is inexpensive to manufacture since it may be easily cast, machined and the small bearings inserted. Since the bearings are small, balanced weight distribution is maintained and thermal problems are virtually eliminated.

The above description should not limit the scope of protection of this invention. The claims below should set forth the bounds of the invention.

I claim:

1. A piston supported in a cylinder and having a generally cylindrically-shaped skirt with piston rings in the skirt;
   a top portion closing one end of said cylindrically-shaped skirt;
   an opening in said cylindrically-shaped skirt below said top portion for mounting a wrist pin;
   a top and bottom set of four vertically aligned roller bearings, above and below said opening, mounted on elongated pins passing through the centers of said roller bearings, said pins fitting in elongated openings in said cylindrically-shaped skirt, the portion of said elongated openings where said roller bearings are located being in open communication with the inside of said skirt for the passage of a lubricant and dissipation of heat therethrough and the clearance of the skirt from a cylinder wall between the rollers permitting a flow of lubrication therebetween;

each of said elongated openings and said pins for holding said roller bearings forming an angle of approximately 30° with the axis of said opening for the wrist pin;

the outer surface of said roller bearings having portions lying on circles which are concentric with the circumference of said cylindrically-shaped skirt, said top and bottom sets of roller bearings and said piston rings being the sole lateral support for the piston skirt within the cylinder.

2. The piston of claim 1 wherein said roller bearings are in direct contact only with said pins and the wall of a cylinder in which the piston is located.

3. A piston supported in a cylinder and having a generally cylindrically-shaped skirt with piston rings in the skirt;

a top portion to close one end of said cylindrically shaped skirt;

a cylindrical bore in a boss integral with said piston;

pins mounted in and wholly supported by two sets of four elongated openings in said cylindrically shaped skirt, said elongated openings having both of its ends open to the outer circumference of said cylindrically shaped skirt, one set of said elongated openings being above the other below said cylindrical bore;

roller bearings mounted on said pins;

the axis of each of said pins being at an angle of approximately 30° from the axis of said cylindrical bore; and the outer surfaces of said roller bearings, defined by housing which are pressed on the bearings, and extending through the outer and inner circumferences of said cylindrically shaped skirt and forming arcs on circles which are concentric with said cylindrically shaped skirt, said roller bearings mounted on said pins and said piston rings being the sole lateral support for the piston skirt within the cylinder.

References Cited

UNITED STATES PATENTS

| | | | |
|---|---|---|---|
| 1,752,816 | 4/1930 | Sologaistoa | 92—178 |
| 3,327,593 | 6/1967 | Ciaccia | 92—178 |

FOREIGN PATENTS

| | | |
|---|---|---|
| 55,074 | 12/1950 | France. |
| 195,109 | 3/1923 | Great Britain. |

MARTIN P. SCHWADRON, *Primary Examiner.*

G. N. BAUM, *Assistant Examiner.*